UNITED STATES PATENT OFFICE.

WILLIAM C. WATSON, OF PATERSON, NEW JERSEY, ASSIGNOR TO HIMSELF AND IRA W. GREGORY, OF BROOKLYN, NEW YORK.

IMPROVEMENT IN THE MANUFACTURE OF LIQUID GLUE.

Specification forming part of Letters Patent No. 59,326, dated October 30, 1866.

*To all whom it may concern:*

Be it known that I, WILLIAM C. WATSON, of Paterson, in the county of Passaic and State of New Jersey, have invented a new and Improved Liquid-Glue Cement; and I do hereby declare that the following is a full, clear, and exact description thereof, which will enable others skilled in the art to make and use the same, reference being had to the accompanying drawings, forming a part of this specification.

The object of this invention is to obtain a liquid glue or cement which will not harden or become solid by time, nor become putrescent, but which may be kept in a liquid state, ready for direct application, for an indefinite period.

My improved liquid-glue cement is composed of the following ingredients: acetic acid, five pounds; glue, four pounds; whiting, one pound; isinglass, one-half pound; solution of tobacco, five pounds.

The tobacco solution is made as strong as possible. A quantity of tobacco is steeped in water until the latter becomes powerfully saturated. I prefer using condensed steam or distilled water.

The whiting gives a body to the composition.

I claim as new and desire to secure by Letters Patent—

A liquid-glue cement composed of the ingredients and about in the proportions specified.

W. C. WATSON.

Witnesses:
WM. F. MCNAMARA,
ALEX. F. ROBERTS.